United States Patent
Yabuki et al.

[19]

[11] Patent Number: 5,877,476
[45] Date of Patent: Mar. 2, 1999

[54] APPARATUS AND METHOD FOR MASS FLOW CONTROL OF A WORKING FLUID

[75] Inventors: Roy M. Yabuki, Los Angeles; Virender Jain, Lake Forest; Richard L. Kenyon, Irvine; Michael Nolan, Costa Mesa., all of Calif.

[73] Assignee: Parker-Hannifin Corp., Cleveland, Ohio

[21] Appl. No.: 722,393

[22] Filed: Sep. 30, 1996

[51] Int. Cl.⁶ ........................................ H05B 1/02
[52] U.S. Cl. ...................... 219/497; 219/494; 219/505; 62/222
[58] Field of Search ................... 219/497, 501, 219/494, 505; 62/228.3, 225, 210, 221, 184, 222; 374/16

[56] References Cited

U.S. PATENT DOCUMENTS

| | | | |
|---|---|---|---|
| 3,478,534 | 11/1969 | Matthies | 62/225 |
| 4,467,183 | 8/1984 | Ishima | 219/497 |
| 4,506,518 | 3/1985 | Yoshikawa et al. | 62/180 |
| 4,638,147 | 1/1987 | Dytch et al. | 219/308 |
| 4,790,145 | 12/1988 | Thompson et al. | 62/212 |
| 4,794,762 | 1/1989 | Orth et al. | 62/203 |
| 4,835,976 | 6/1989 | Torrence | 62/115 |
| 4,848,100 | 7/1989 | Barthel et al. | 62/212 |
| 4,944,160 | 7/1990 | Malone et al. | 62/180 |
| 4,995,240 | 2/1991 | Barthel et al. | 62/225 |
| 5,011,162 | 4/1991 | Jelinek | 277/11 |
| 5,044,401 | 9/1991 | Giesler et al. | 137/614.03 |
| 5,092,152 | 3/1992 | Miller et al. | 72/402 |
| 5,092,634 | 3/1992 | Miller | 285/222 |
| 5,252,939 | 10/1993 | Riefler et al. | 335/280 |
| 5,289,692 | 3/1994 | Campbell et al. | 62/181 |
| 5,295,656 | 3/1994 | Campbell et al. | 251/129.02 |
| 5,335,513 | 8/1994 | Campbell et al. | 62/228.3 |
| 5,390,897 | 2/1995 | Campbell et al. | 251/129.02 |
| 5,449,884 | 9/1995 | Lee | 219/497 |
| 5,460,349 | 10/1995 | Campbell et al. | 251/129.15 |
| 5,477,701 | 12/1995 | Kenyon et al. | 62/225 |
| 5,522,231 | 6/1996 | Kenyon et al. | 62/129 |
| 5,537,089 | 7/1996 | Greif et al. | 336/215 |

FOREIGN PATENT DOCUMENTS 0 276 491 A2  12/1987  European Pat. Off. .
0 678 717 A2   1/1991  European Pat. Off. .

*Primary Examiner*—Mark H. Paschall
*Attorney, Agent, or Firm*—Calfee, Halter & Griswold LLP

[57] ABSTRACT

Apparatus for detecting working fluid state in a heat transfer system of the type having an evaporator and an expansion valve for controlling mass flow of the working fluid to the evaporator, comprises a first sensor disposed in the working fluid on the outlet side of the evaporator; the first sensor producing a first signal related to the working fluid state; a second sensor disposed in the working fluid on the inlet side of the evaporator; the second sensor producing a second signal related to a pressure dependent characteristic of the working fluid; and a control circuit for receiving the first and second signals and determining the working fluid state based on a ratio of the first and second signals.

23 Claims, 5 Drawing Sheets

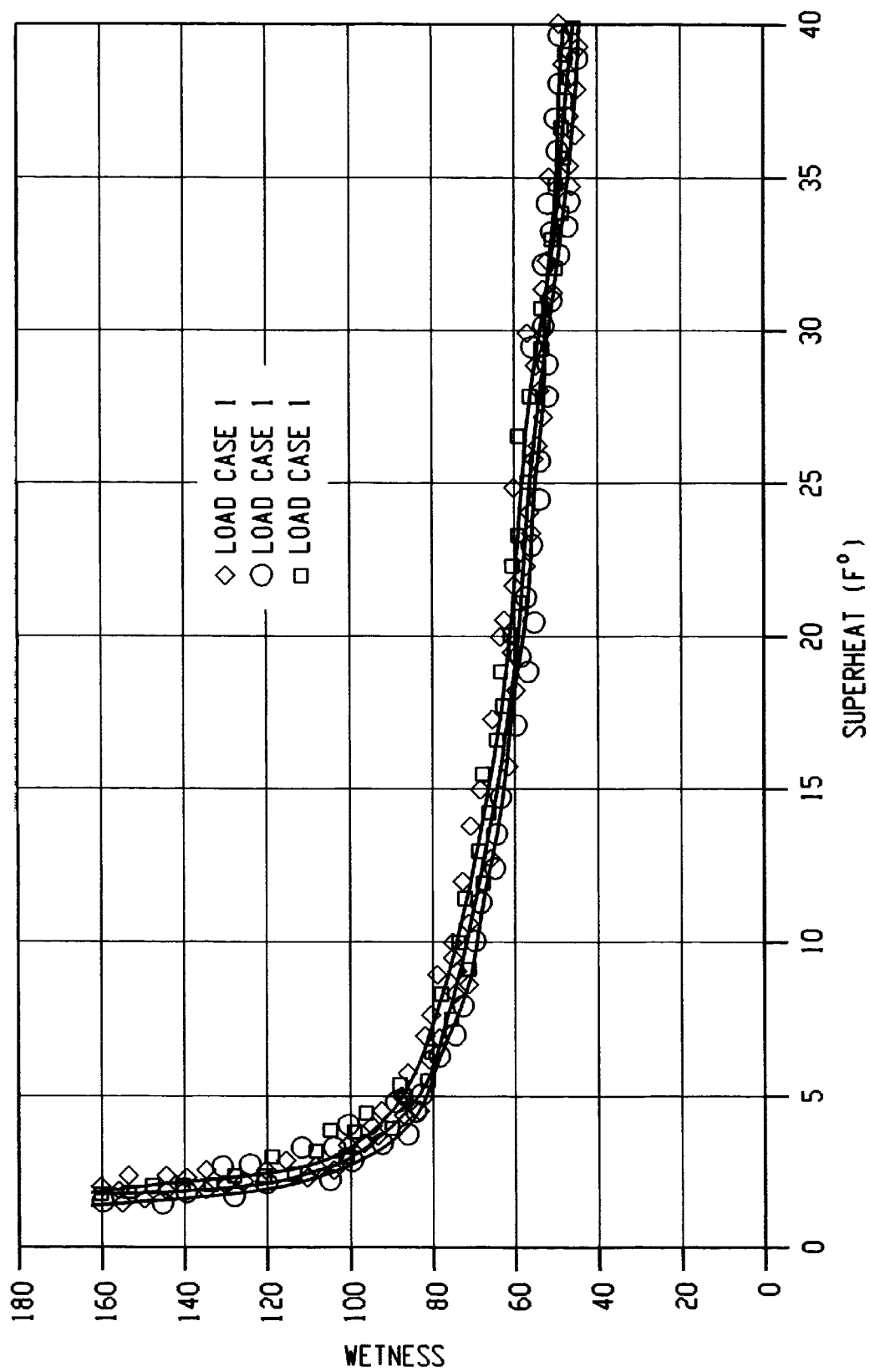

APPARATUS AND METHOD FOR MASS FLOW CONTROL OF A WORKING FLUID

BACKGROUND OF THE INVENTION

This application is related to U.S. Pat. Nos. 5,289,692, 5,477,701 and 5,522,231; the entire disclosures of which are fully incorporated herein by reference. These patents are referred to herein collectively as the Low Side patents.

The invention relates generally to heat transfer and refrigeration control systems. More particularly, the invention relates to apparatus and methods for detecting characteristics and for controlling mass flow of the working fluid in such systems.

The basic building blocks of all refrigeration and heat transfer systems are well known and include a compressor, a condenser, an expansion means and an evaporator, all of which are connected in a fluid circuit having a working fluid such as halogen containing working fluids such as chlorofluorocarbons (CFCs), hydrochlorofluorocarbons (HCFCs), and hydrofluorocarbons (HFCs), and so forth. In an automotive or truck air conditioning system, for example, the working fluid or refrigerant is typically in heat exchange with the vehicle compartment ambient air by means of the evaporator. The liquid refrigerant turns to gas as it passes through the evaporator or endothermic heat exchanger thus absorbing heat from the ambient air. The working fluid leaving the evaporator, preferably is in an all gaseous state, and is drawn into the compressor through a suction line. The compressor increases the gas pressure and the gas then passes through the condenser or exothermic heat exchanger where it is cooled back to a liquid state but is still under high pressure. The liquid high pressure working fluid is then passed through the expansion means, such as an expansion valve, wherein the fluid pressure is adiabatically decreased prior to re-entering the evaporator.

Over the years, many different types of control mechanisms and monitoring devices have been used to regulate the operation of heat transfer or refrigeration systems. One of the more important functions required of a heat transfer control system is to monitor and control the low pressure state of the working fluid in the suction line near the outlet of the evaporator or at the inlet to the compressor. Usually, the systems are designed to operate with the working fluid in a superheated state at the outlet of the evaporator. This is important for many reasons, particularly to maximize cooling from the working fluid flow, and to protect the compressor from receiving liquid working fluid and/or a loss of lubricant.

A known technique for controlling the working fluid state is to maintain a minimum superheat state in the vaporous working fluid exiting the evaporator. The superheat is usually maintained in the range of 5 to 10 degrees fahrenheit. In some systems, the superheat is regulated by monitoring the evaporator inlet and outlet temperatures of the working fluid and controlling the flow with the expansion valve so that the temperature difference is near a preset value or range. Other approaches include the use of pressure and temperature sensors on the outlet side of the evaporator to measure the actual temperature and pressure characteristics of the working fluid based on the thermodynamic properties of the working fluid. Still another approach is the use of charged bulb sensors. From a heat transfer efficiency standpoint, it is desirable, of course, to maintain a low superheat which is difficult with the aforementioned sensors and controls.

Although these known approaches for regulating superheat can work, they tend to exhibit inaccurate control. One reason is that in the evaporator the liquid and gas phases are not in thermal equilibrium. The droplets of gas are boiling because heat is being transferred to the droplets from the gas phase. In order for this to take place, the gas must be hotter than the liquid, which makes conventional superheat measurement difficult.

Some heat transfer systems are designed to operate "wet", in other words with an expected quality less than 100% at the evaporator outlet. Known apparatus for detecting working fluid conditions and states such as percent quality and superheat typically operate best under one of these states or the other, but not both. For example, a quality detector that is sensitive to liquid droplets in the working fluid may not operate accurately to detect superheat conditions. Detectors that operate to measure superheat may not operate accurately to detect working fluid states in which the quality is less than 100%.

Another significant problem with low superheat control systems is that pressure drop of the working fluid through the evaporator can change over a large range, particularly for heat transfer systems that operate under varying loads and other dynamic operating conditions. Substantial pressure changes reduce the effectiveness of conventional superheat based control systems. Therefore, superheat as measured by temperature differentials across the evaporator is a poor control mechanism for regulating the state of the working fluid at the outlet of the evaporator in dynamic systems that exhibit significant changes in evaporator pressure.

The apparatus and methods, for detecting and controlling quality in a working fluid, that are described in the above-incorporated Low Side patents, may not always provide adequate control when systems operate with the working fluid in higher superheated states, such as, for example, greater than 5° F. For example, a quality sensor that is used for determining thermal conductance between the sensor and the working fluid droplets is not always effective under higher superheat conditions because of the relative absence of liquid droplets in the working fluid at the sensor. It has also been found that a self-heated thermistor, when used as a quality sensor, produces readings that are dependent on the thermal load conditions of the evaporator. Although the Low Side sensor techniques in the referenced patents are useful in many applications, it is desired to improve the effectiveness of such sensors under conditions of higher superheat and/or substantial load variations.

Accordingly, the objectives exist for economical, reliable and accurate apparatus and methods for detecting state characteristics of a working fluid in a heat transfer system, particularly as those characteristics relate to detecting and controlling quality and superheat states of the working fluid on the outlet side of the evaporator.

SUMMARY OF THE INVENTION

The present invention contemplates apparatus and methods for detecting and controlling characteristics of a working fluid for a heat transfer system. In one embodiment of the invention, such apparatus for detecting working fluid state in a heat transfer system of the type having an evaporator and an expansion valve for controlling mass flow of the working fluid to the evaporator, comprises a first sensor disposed in the working fluid on the outlet side of the evaporator; the first sensor producing a first signal related to the working fluid state; a second sensor disposed in the working fluid on the inlet side of the evaporator; the second sensor producing a second signal related to a pressure dependent characteristic of the working fluid; and control means for receiving the first and second signals and determining the working fluid state based on a ratio of the first and second signals.

The invention further contemplates the methods associated with the use of such apparatus, as well as in another embodiment, a method for controlling mass flow of a working fluid through an expansion valve and evaporator in a heat transfer system, comprising the steps of:

a) detecting the working fluid state on the outlet side of the evaporator;

b) detecting a characteristic of the working fluid state on the inlet side of the evaporator related to load changes at the evaporator;

c) compensating the detected working fluid state for the detected load changes; and d) adjusting mass flow of the working fluid through the evaporator to maintain a state setpoint of the working fluid.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 5 is a graph representing the relationship between detected wetness/superheat for a low side sensor compensated for load variations in accordance with the invention.

DETAILED DESCRIPTION OF THE INVENTION

Figure 1:
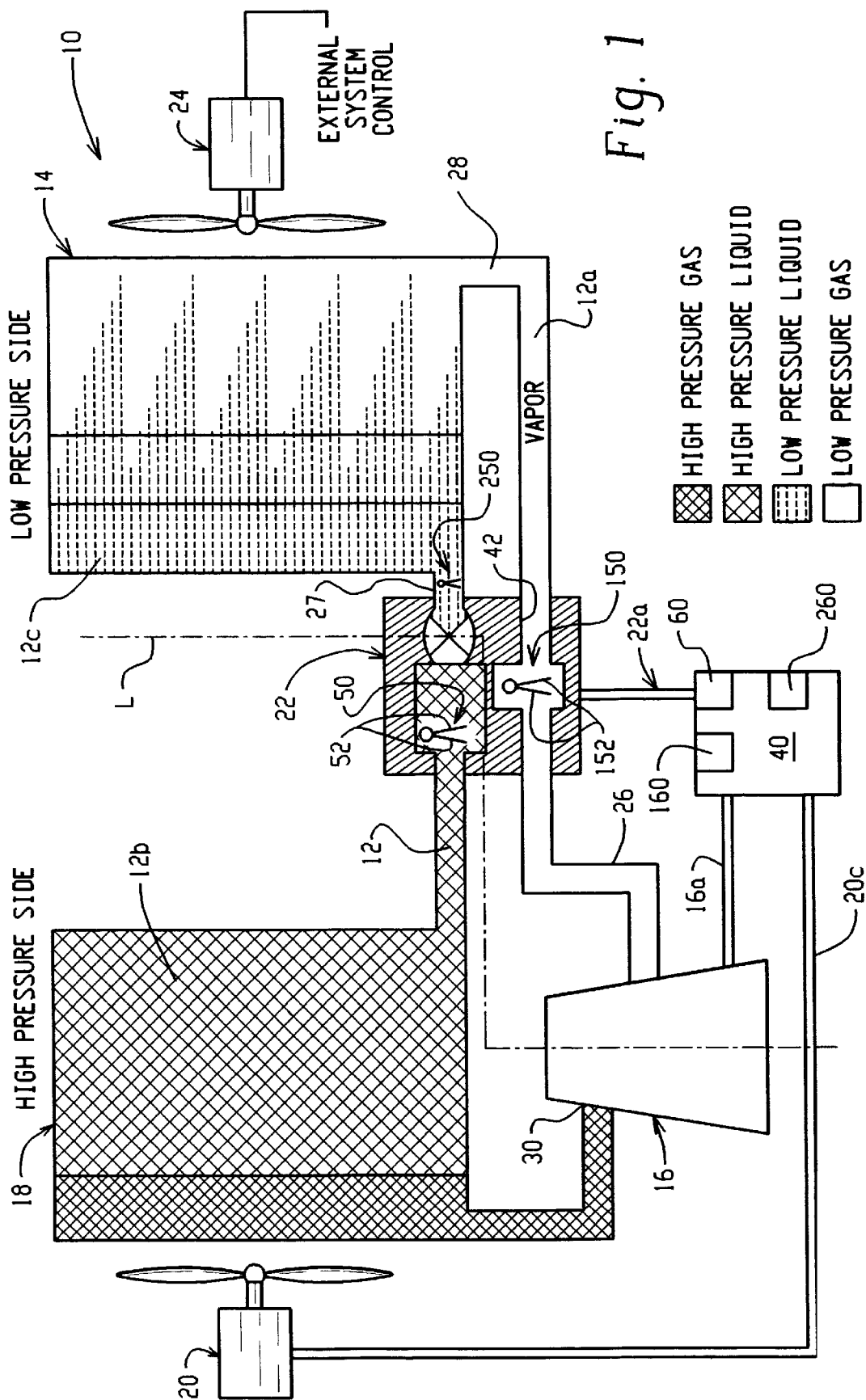
FIG. 1 is a simplified schematic diagram of a heat transfer system suitable for use with the present invention including sensors according to the invention incorporated therein.

With reference to FIG. 1, a heat transfer system is generally designated by the numeral 10. For convenience, the invention is described herein in connection with a vehicle air conditioning system such as may be used for cars and trucks. However, this exemplary description is only for convenience, ease of explanation and clarity and should not be construed in a limiting sense. For this reason, the heat transfer system components are described in basically generic terms without specific detail because they form no particular part of the invention except as specifically noted herein. The invention is suitable for use with any type of heat transfer system including, but not limited to, commercial refrigeration, heat pump systems, residential air conditioning, industrial air conditioning and so forth. The invention is particularly useful for vehicle air conditioning because of its small size, low power consumption and fast response to system conditions. Furthermore, the invention is not limited to use with specific working fluids, but can be used to determine characteristics of any working fluid compatible with the temperature dependent resistance devices. Of particular interest for future refrigeration management systems is that the invention is suited for use with R-134 working fluid.

As used herein, the terms "refrigerant" and "working fluid" are used interchangeably and in their broadest sense to include any fluid used to effect exothermic and endothermic heat transfer. Furthermore, the terms "heat transfer" and "refrigeration" are not intended to be limiting in any sense, so that it will be understood that the invention can be used with cooling systems, heating systems and systems that interchangeably heat and cool.

In general then, the heat transfer system 10 includes a working fluid 12, such as, for example, R-12 or R-134 in an interconnected fluid circuit that includes an evaporator 14, a compressor or pump 16, a condenser 18 including a condenser fan 20 and an expansion device 22. The evaporator 14 typically is positioned proximate a fan 24 that blows ambient air, such as passenger compartment air, over cooling fins on the evaporator so that the working fluid 12 absorbs heat from the ambient air. In FIG. 1 the working fluid 12 is shaded in different ways to illustrate in an exemplary manner the different phases and pressure conditions typical in a heat transfer system 10. The dashed line "L" illustrated in FIG. 1 generally notes the pressure line—working fluid in the components to the left of the line L is generally under high pressure, and working fluid in components to the right of the line L is generally under low pressure.

The compressor 16 draws gaseous working fluid 12a through a suction line 26 from the evaporator outlet 28. The compressor 16 raises the pressure of the gaseous working fluid 12, typically to an operating pressure of several hundred PSIA. From the compressor outlet 30, the working fluid 12 flows to the condenser 18 wherein it is cooled to a liquid state 12b. Cooling of the fluid 12 can be regulated by operation of a condenser fan 20.

The expansion device 22 is preferably an expansion valve that is used to regulate the flow of high pressure liquid working fluid 12b to the evaporator inlet 27 while dropping the pressure of the working fluid to the operating pressure of the evaporator 14. As the low pressure liquid working fluid 12c passes through the evaporator 14, it absorbs heat from the ambient air and vaporizes or boils off. In a typical heat transfer system, it is often desirable that only vaporous working fluid flow into the compressor 16 from the evaporator 14. Thus, the working fluid will typically be in or nearly in a completely vapor state by the time it exits the evaporator 14. However, for heat transfer systems that operate in dynamic environments where the ambient load can change significantly, as well as other dynamic conditions, the heat transfer system may start to operate in a "wet" state or with a higher wetness than under normal steady state conditions. This is particularly so for systems that are designed to operate at low superheat conditions wherein some degree of wetness is expected.

An electronic controller circuit 40 may be used to control operation of the condenser fan 20 using signal lines 20a, to activate and deactivate the compressor 16 motor and/or clutch (not shown) using signal lines 16a, and to control operation of the expansion valve 22 using signal lines 22a. Typically, the controller 40 increases flow of working fluid 12 through the valve 22 as the thermal load increases, and decreases the flow when the thermal load decreases. Also, as the pressure increases on the inlet side of the valve 22 the controller 40 may either turn the compressor 16 clutch off, or actuate the condenser fan 20 on, or combinations of all the above.

These and other various control functions can be programmed into the controller 40 in a known manner to maintain the operating parameters or state setpoints of the working fluid within predetermined limits. An important aspect for various control algorithms is to monitor or detect the working fluid 12 pressure on the high pressure side of the system 10, such as between the condenser outlet and the valve 22 inlet. The present embodiment uses a preferred high pressure sensor and method embodied in the form of a self-heated thermistor that exhibits a heat transfer or conductance transition that can be correlated to saturation pressure characteristics of the working fluid 12. Such a high pressure sensor and method is fully described in U.S. Pat. No. 5,335,513 entitled "APPARATUS AND METHOD FOR DETECTING CHARACTERISTICS OF A WORKING FLUID" issued on Aug. 9, 1994; and U.S. patent application Ser. No. 08/460,212 entitled "APPARATUS AND METHOD FOR DETECTING CHARACTERISTICS OF A WORKING FLUID" filed on Jun. 2, 1995; both of which are commonly owned by the assignee of the present invention, the entire disclosures of which are fully incorporated herein by reference. These disclosures are referred to collectively herein as the High Side sensor disclosure. Other pressure sensors, however, can be used with the present invention.

As described in the above referenced High Side disclosure, and in a preferred embodiment thereof, a high pressure side working fluid sensor for a heat transfer system includes a temperature dependent electrical resistance element 50 that preferably is disposed in direct thermal contact with the working fluid. In this configuration, the resistance element 50 is used to locally heat the working fluid. For the exemplary system described herein, the resistance element 50 is positioned in the fluid circuit near the high pressure inlet port of the expansion valve 22. However, this particular location is exemplary only, and those skilled in the art will readily appreciate that the resistance element 50 can be positioned at locations in the fluid circuit where it is desired to detect characteristics of the working fluid.

The resistance element 50 is preferably realized in the form of a thermistor, such as part no. E15SA1B053 available from Victory Engineering. A thermistor is used because it can easily be monitored by the electronic controller 40, and also because it can be used conveniently to heat locally the working fluid by passing current therethrough and as a fluid temperature sensor. However, the invention is not limited to the use of a thermistor as the resistance element 50, and other devices such as resistance temperature devices (RTDs), or a temperature sensor in combination with a separate heating element, could be used, just to name a few.

The thermistor 50 includes two electrical leads 52 that are connected to a control circuit 60 that preferably is included as part of the system controller 40. The detailed design for a suitable control circuit 60 for the high side pressure sensor is fully described in the above-referenced patent. The thermistor leads 52 can be connected to the control circuit 60 via the multiwire cable 22a which, as described above, also includes electrical leads for connecting the expansion valve 22 to the system controller 40.

The control circuit 60 produces an output control signal on one of the signal lines 22a at appropriate times and intervals. The control signal has two discrete states, high and low. During each time period when the control signal is high, the current through the thermistor 50 is a very low level current. This low current time period can thus be used to sense the temperature of the working fluid 12 because the thermistor 50 does not appreciably self-heat. During each time period when the control signal is low, a generally linear time varying current through the thermistor 50 is produced. This current control signal causes the thermistor 50 to gradually self-heat which in turn causes localized heating of the working fluid 12. In a typical system, the low level sensing current may be on the order of 8 to 20 milliamps and the self-heating current may be ramped up to, for example, 300 milliamps. The high and low current time periods may be selected to be of any convenient duration. A range of about 0.69 to 2 seconds for the temperature sensing period has been found suitable, while a time period from about 1.9 to 8 seconds for the current ramp time has been found suitable. These time periods are exemplary and not critical, however, and the system 40 can be programmed to vary these times as required for a specific application.

As described in the High Side sensor disclosure, the control circuit 60 is programmed to determine a local minimum thermal resistance or conductance as between the thermistor 50 and the working fluid 12. This local minimum thermal conductance/resistance is detectable as the thermistor 50 is gradually self-heated, because when the working fluid 12 reaches saturation temperature (locally in the volume around the thermistor 50) there is a detectable change in the thermal conductance or heat transfer efficiency from the thermistor 50 to the surrounding fluid. The thermistor 50 is operated in the low current and high current modes as part of the data acquisition for determining the thermal conductance/resistance characteristic. In this manner, the thermistor 50 can be used to detect a characteristic of the working fluid 12, on the high pressure side of the valve 22, that closely correlates with the saturation temperature thereof, and hence serves as an accurate pressure sensor. For purposes of the instant invention, the value "HSSATT" refers to the determination of the working fluid high pressure side saturation temperature related characteristic determined by the control circuit 60 using the high side thermistor 50.

The expansion valve 22 is preferably realized in the form of a linear proportional solenoid actuated valve, controlled electrically by a solenoid current supplied by the system controller 40. Such a valve is fully described in U.S. patent applications Ser. No. 951,259 filed on Sep. 25, 1992 entitled "Low Friction Solenoid Actuator and Valve", now U.S. Pat. No. 5,252,939; Ser. No. 961,563 filed on Oct. 15, 1992 entitled "Expansion Valve For Air Conditioning System With Proportional Solenoid" now U.S. Pat. No. 5,460,349; Ser. No. 961,567 filed on Oct. 15, 1992 entitled "Expansion Valve Control Element for Air Conditioning System", now U.S. Pat. No. 5,295,656; all of which are commonly owned by the assignee of the present invention, the entire disclosures of which are fully incorporated herein by reference.

In accordance with the present invention, a low side sensor 150 is provided that is used to detect characteristics of the working fluid 12 on the outlet side of the evaporator 14. The low side sensor 150 can be used to detect quality of the working fluid 12, and this mode of operation is fully described in the above referenced disclosures. The sensor 150 can also be used, as set forth in detail hereinafter, to detect superheat characteristics of the working fluid 12, particularly under operating conditions of the system 10 which cause the working fluid 12 to be in a higher superheat condition, for example, greater than 5° F. superheat. Such conditions may arise from, for example, a significant change in the load for the heat transfer system, or a commanded higher superheat condition such as during a mass flow reduction mode (as described in the above disclosures). The controller 40 can then use the detected low side working fluid state (and other detected characteristics such as temperature) and adjust mass flow via the valve 22, pressure via the compressor, condenser cooling and so on through the evaporator 14 to maintain the working fluid state at a selected setpoint stored in the controller 40 memory.

In a preferred embodiment, the low side sensor 150 is realized in the form of a temperature dependent resistance element that preferably is disposed in direct thermal contact with the working fluid 12 on the outlet side of the evaporator 14. For the exemplary system described herein, the sensor 150 is positioned in the fluid circuit in a through port 42 formed in the valve 22 body which forms part of the suction line connection from the evaporator 14 to the compressor 16. However, this particular location in the fluid circuit is exemplary only, and those skilled in the art will readily appreciate that the sensor 150 can be positioned at any location where characteristics of the working fluid 12 are to be detected. Typically this will be in the suction line 26 at or between the evaporator 14 outlet and the compressor 16 inlet.

The sensor 150 is preferably realized in the form of a thermistor, such as part no. E15SA1B053 available from Victory Engineering. A thermistor is preferably used because it is low in cost, can be monitored easily by the electronic controller 40, and also because it can conveniently be used in a self-heated and non self-heated mode by controlling the current therethrough.

The thermistor sensor 150 includes electrical leads 152 that are connected to a control circuit 160 that preferably is included as part of the system controller 40. The thermistor leads 152 can be connected to the control circuit 160 via the multiwire cable 22a. However, the control circuit 160 for operating the sensor 150 does not have to be part of the overall system controller but can be separately provided as a stand alone circuit or separate circuit module connected to the system controller.

Figure 2:
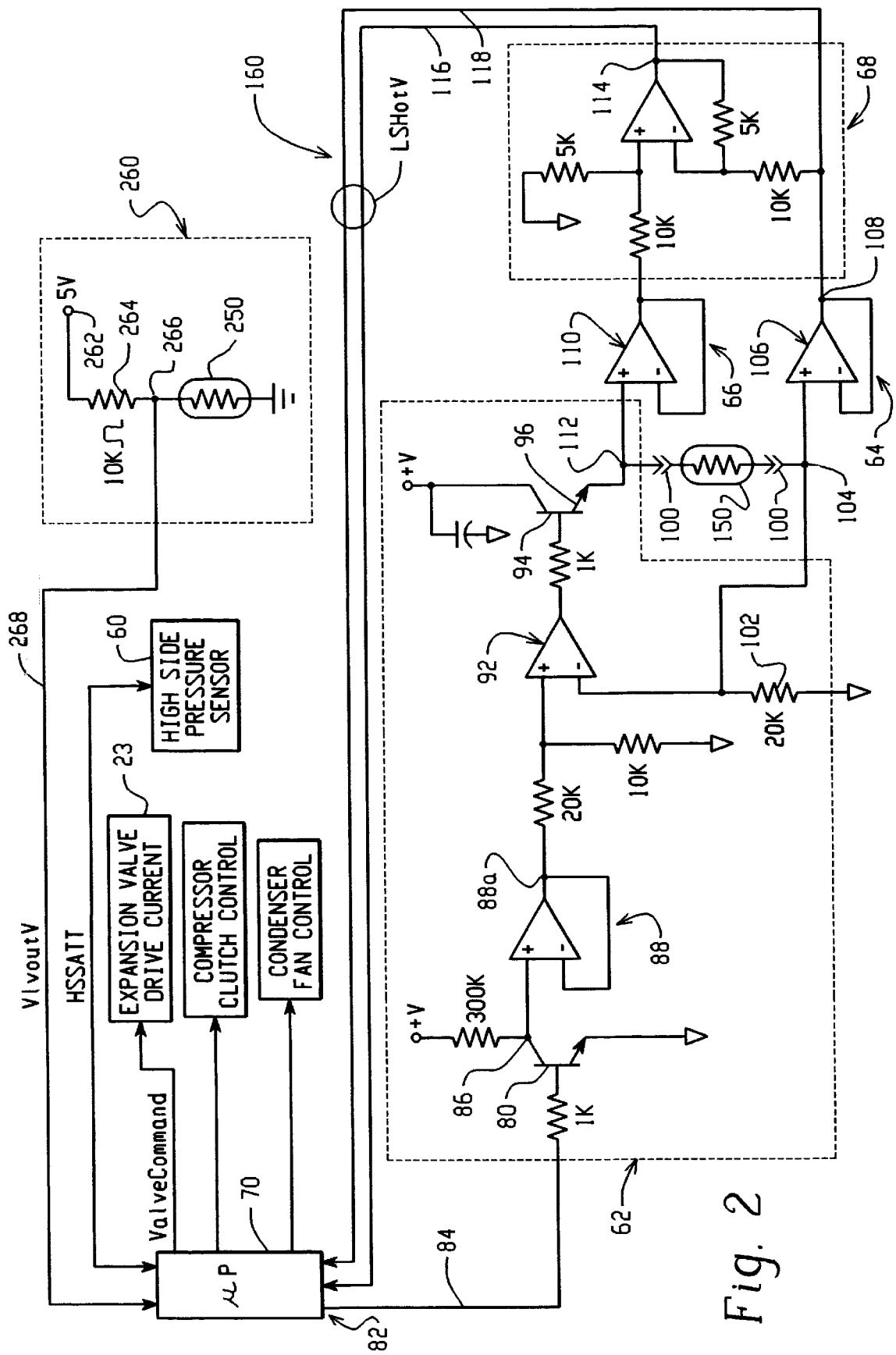
FIG. 2 is a circuit schematic of a preferred control circuit for use with the invention.

With reference now to FIG. 2, there is illustrated therein a preferred control circuit 160 used in combination with the thermistor 150 to realize a quality and superheat sensor in accordance with the teachings of the present invention. This circuit is, from a hardware and connection standpoint, substantially identical to the low side sensor control circuit described in the above referenced 5,477,701 Pat. No., and reference may be made thereto for the description of operation. In short, the circuit 160 is used to apply a fixed current level, for example, 80 milliamps to the thermistor 150 to cause the thermistor to self-heat. The circuit 160 also includes two signal lines 116 and 118 that are input to a microprocessor 70 that uses the signals to calculate the resistance of the thermistor 150. The circuit 160 can also be used to apply a low non self-heating current level to the thermistor 150 if needed for a particular application.

In the present invention, it is contemplated that the low side sensor 150 will typically be operated in a continuous self-heated mode, although other modes are available as needed. The output of the low side sensor 150 in the self-heated mode as determined by the microprocessor 70 is referred to hereinafter as LSHotV (for Low Side hot voltage—i.e. the sensor 150 voltage value in a self-heat mode) and corresponds to the resistance of the thermistor 150 and thus the detected temperature of the working fluid 12 in contact with the thermistor 150 on the outlet side of the evaporator 14. The detected temperature is actually the sum of the temperature due to self-heating plus the working fluid temperature.

In the self-heated mode, the low side sensor 150 can detect working fluid quality because the liquid droplets dramatically alter the sensor's heat transfer characteristics and thus resistance value, as fully described in the above referenced disclosures. For a conventional self-heated thermistor quality sensor 150 that produces an output based on fluid temperature, wetness and superheat are observed to be inversely proportional. That is, as mass flow through the evaporator 14 increases, wetness (i.e. droplet size and number) increases and superheat decreases. This is illustrated in a representative manner in FIG. 3, which illustrates quality/superheat detection using a self-heated thermistor without compensation for load variations. Conversely, at low superheat states, as mass flow of the working fluid 12 through the evaporator decreases, wetness decreases and superheat increases.

However, above about 5° F. superheat, mass flow can increase significantly with little detectable change in wetness, thus rendering quality detection using thermal conductance less effective for controlling mass flow through the evaporator 14 at higher superheats. In other words, a quality sensor that is used for detecting thermal conductance between the thermistor and the working fluid produces a superheat/wetness curve with a very small or undetectable slope in the superheat region [e.g. the curves in FIG. 3 would be generally flat above 5° F. superheat].

Figure 3:
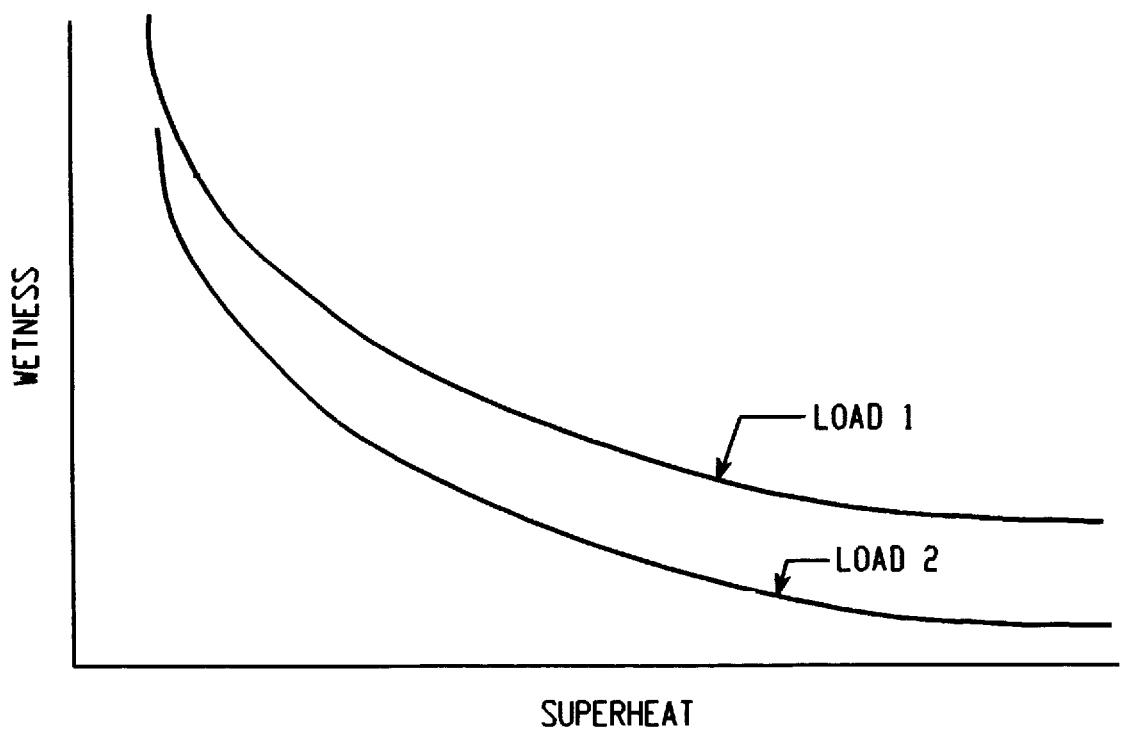
FIG. 3 is a graph representing a relationship between wetness and superheat at the outlet side of a typical evaporator used with a heat transfer system such as shown in FIG. 1 as detected with a self-heated thermistor.

Although a conventional self-heated low side sensor based on temperature detection (in contrast to thermal conductance detection) can be effectively used for superheat measurement, such a sensor is not particularly effective in the quality region when droplets are present. Additionally, conventional superheat control accuracy is typically dependent on a low and relatively stable pressure drop across the evaporator. Still further, and as shown in FIG. 3, it has been observed that a self-heated thermistor used to detect superheat produces readings that are dependent on the thermal load at the evaporator, as will be further discussed hereinafter.

In this embodiment of the present invention, a third sensor 250 is used. This sensor 250 is disposed in the working fluid 12 on the low pressure side of the expansion valve 22, such as, for example, at the inlet 27 to the evaporator 14. The third sensor 250 is preferably realized in the form of a thermistor, and conveniently can be the same type thermistor as used for the low side sensor 150. Another thermistor that is suitable is part no. E41SF0B044 available from Victory Engineering. The sensor 250 is electrically connected to a sensing circuit 260 by suitable leads (not shown in FIG. 1). The sensing circuit 260 can conveniently be incorporated as part of the control circuit 40 electronics.

As illustrated in FIG. 2, the sensing circuit 260 is simply a low voltage supply 262 series connected with a resistor 264 and the thermistor 250. A sense node 266 is connected via a signal line 268 to an analog input to the microprocessor controller 70. If needed, the signal at the sense node 266 can first be converted to a digital input signal using a standard analog to digital converter (not shown). With a low current supplied to the thermistor 250, voltage signals produced at the node 266 correspond to the resistance of the thermistor 250 and hence the temperature of the working fluid 12 on the inlet low pressure side of the evaporator 14. This signal is referred to hereinafter as "VlvoutV" (valve out voltage corresponding to saturation temperature of working fluid at inlet to the evaporator 14). For purposes of the instant invention it is assumed that the working fluid 12 is saturated at the inlet to the evaporator 14, and hence the third sensor 250 detects the saturation temperature of the working fluid 12.

The microprocessor 70 is programmed using conventional programming techniques. The microprocessor 70 uses the low side sensor 150 as a control element for detecting the state of the working fluid 12 on the outlet side of the evaporator 14. The microprocessor 70 then uses such information as part of its control algorithm for controlling mass flow of the working fluid 12 through the evaporator 14, as well as regulating the high side pressure, the compressor 16, the condenser fan 20 and so on. The overall system control algorithm implemented using the microprocessor controller 70 forms no particular part of the present invention, other than to the extent that the sensors 50, 150 and 250 as described herein are used as working fluid sensors. A control algorithm that uses a low side and high side sensor is described in the above noted disclosures and reference may be made thereto for further detail. The present invention is more specifically directed to the technique for improving the accuracy of the low side sensor.

In accordance with the invention then, the microprocessor 70 is programmed to determine the state of the working fluid 12 on the outlet side of the evaporator 14 using the low side sensor 150. For such operation, several assumptions are made. The first, already stated, is that the working fluid 12 at the inlet to the evaporator 14 is saturated, so that the third sensor 250 detects the saturation temperature of the working fluid 12. A second assumption is that for low superheat conditions, there are liquid droplets in the working fluid 12 on the outlet side of the evaporator 14 (i.e. the quality is less than 100%). Although this assumption seems inapposite to the strict scientific definition of "superheat", it has been observed empirically, and can best be understood in the context that a typical heat transfer system is dynamic, not a static system such as might be found in a laboratory. The thermal load on the heat transfer system often changes, and can change dramatically. Also significant is that the compressor 16 typically is driven by an engine having a constantly changing speed. Hence, the pressure of the working fluid 12 in the heat transfer system 10 is dynamic, and under superheat conditions droplets can be present at the evaporator 14 outlet. These droplets are not in thermal equilibrium with the surrounding gas because the working fluid is boiling off within the evaporator. Another assumption is that for high superheat and low pressure drop across the evaporator 14, the difference in temperature between the third sensor 250 and the low side sensor 150 is a good measure of the superheat.

As noted herein above, for low superheat states, droplets are observed in the working fluid, with wetness and superheat exhibiting a generally inverse relationship. The low side sensor 150 alone can detect such wetness in the self heated mode due to the detectable thermal transfer changes when the cooler droplets hit the thermistor 150, as described in the Low Side patents for the low side sensor 150 referred to above. Thus, the value LSHotV is a measure of wetness/superheat. The use of the low side sensor 150 in the self-heated mode without detecting thermal conductance is preferred for systems that also operate under higher superheat conditions as well as wetter conditions because, as best shown in FIG. 3, such a sensor exhibits a detectable slope in its response curve even at relatively high superheat conditions (>5° F. superheat, for example).

It has been observed, however, that the wetness/superheat relationship as detected by the self-heated thermistor 150 (LSHotV) shifts under different load conditions, and this is also illustrated in FIG. 3. Thus, even though the inverse relationship between wetness and superheat is still present, a changing thermal load on the system causes an uncompensated low side sensor 150 to operate on a different curve. If left uncorrected, this can induce errors in the control function for the heat transfer system because the controller 40 will be adjusting mass flow and other parameters based on incorrect state conditions of the working fluid at the outlet side of the evaporator 14.

In accordance with one aspect of the invention, the low side sensor 150 signal LSHotV is compensated for such load variations by programming the controller 70 to calculate the ratio of the low side sensor signal LSHotV to the third sensor signal VlvoutV, or WetSup=LSHotV/VlvoutV. This ratio compensates the low side sensor 150 signal for load variations because the saturation temperature of the working fluid 12, indicated by the third sensor 250 as value VlvoutV, also changes with load. In effect, the ratio using the VlvoutV value normalizes the low side sensor 150 data for load variations. FIG. 5 illustrates in a representative manner compensated sensor 150 readings under three load conditions. Note that, unlike the curves in FIG. 3, the curves in FIG. 5 generally lie on top of each other, meaning that the LSHotV/VlvoutV readings are predictable across different load conditions.

The ratio LSHotV/VlvoutV can be used to improve the accuracy of the low side sensor 150 detection of superheat, wetness and quality when the pressure drop across the evaporator 14 is low. However, as noted hereinabove, load variations also can cause significant pressure changes across the evaporator. Since the ratio LSHotV/VlvoutV assumes the working fluid 12 is saturated, the pressure changes under different loads should also be taken into account when required for more accurate control of mass flow of the working fluid 12.

Figure 4:
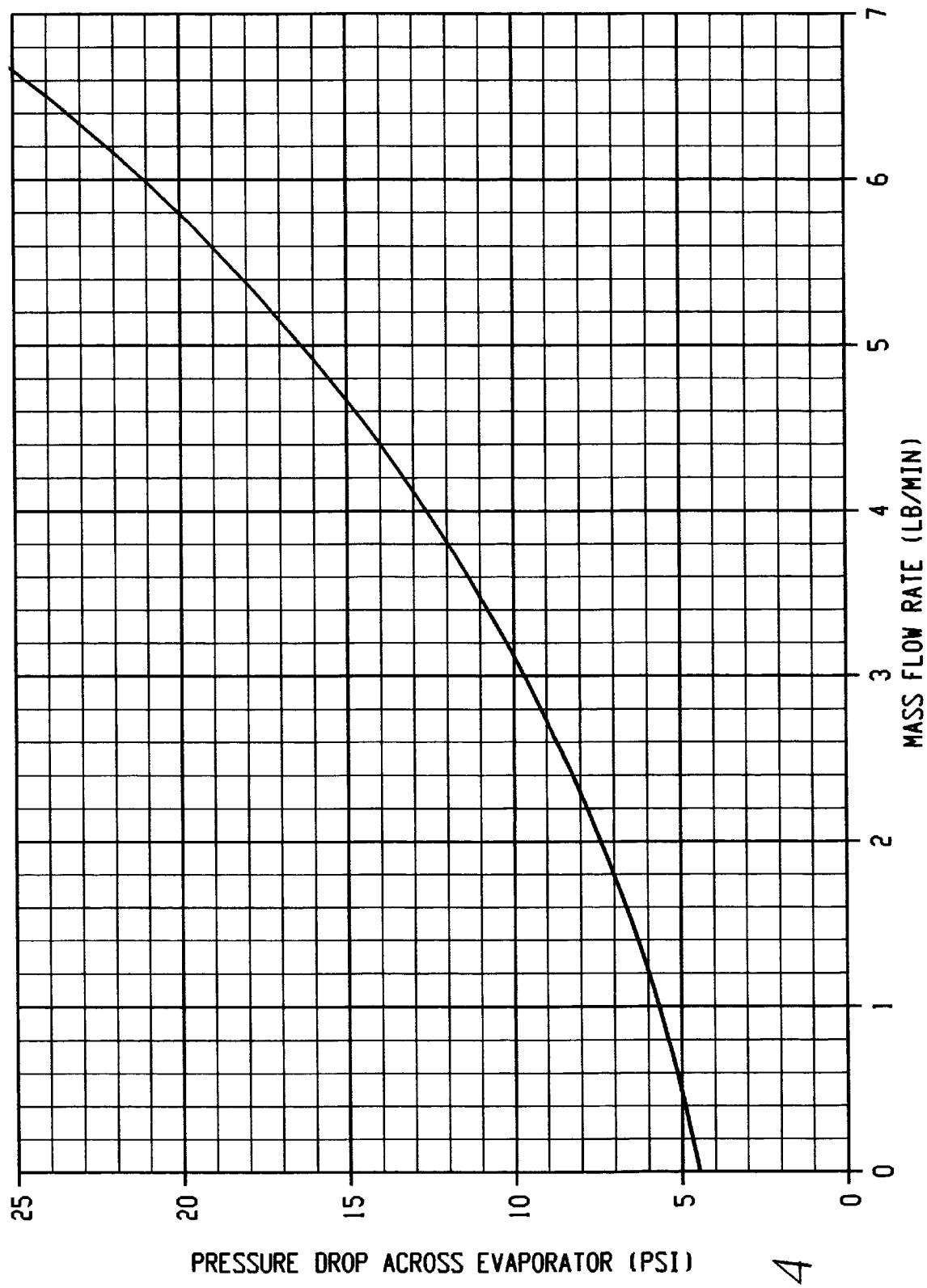
FIG. 4 is a graph representing a relationship between mass flow rate and pressure drop in a typical evaporator used with a heat transfer system such as shown in FIG. 1.

In accordance with another aspect of the present invention then, pressure changes across the evaporator 14 caused by load variations can be detected by detecting the mass flow through the expansion valve 22. FIG. 4 illustrates in a simplified way the general relationship between mass flow rate of the working fluid and pressure drop across the evaporator 14. This graph is intended to be exemplary only for purposes of illustration, it being recognized that different evaporators and heat transfer systems may exhibit different relationships. But the important point to note is that mass flow rates can be used as an indicator of pressure changes across the evaporator 14.

The thermistor sensors 50 and 250 provide a convenient way to detect the mass flow rate on a real time basis. The value HSSATT, as noted hereinbefore, corresponds to the saturation temperature which is directly related to the saturation pressure of the working fluid 12 on the high pressure side of the valve 22. The value VlvoutV is a voltage that corresponds to the saturation temperature of the working fluid 12 on the low pressure side of the valve 22, and VlvoutV thus changes as the pressure at the sensor 250 changes, since it is assumed that the working fluid 12 is saturated at the inlet to the evaporator 14. We further define VlvoutT as the corresponding temperature value of VlvoutV.

The microprocessor 70 is programmed to calculate mass flow using the sensor 150 and 50 as follows. As noted in FIG. 1, the controller 70 produces a signal that controls the drive current 23 to the expansion valve 22, and is referred to herein as "ValveCommand". This current is directly related to the valve 22 position and hence the volume of working fluid flowing through the valve 22. The difference of HSSATT and VlvoutT is related to the pressure drop across the valve 22, since both values are determined for the working fluid 12 in a saturated state. The calculated product then, ValveCommand*[HSSATT-VlvoutT]=LoadF, corresponds to the mass flow of working fluid through the valve 22. Appropriate weighing factors and scaling factors may be needed for the various values used in the calculation of ValveCommand*[HSSATT-VlvoutT], based on each specific application, valve characteristics, evaporator characteristics and so on. But the basic calculated product will provide a result that is related to the mass flow through the valve 22, simply using two thermistors 50 and 250 (the high side thermistor 50 being used in a self-heated and non self-heated mode as set forth in the above referenced high side sensor patents for detecting saturation pressure on the valve high pressure side) and the thermistor 250 being used simply as a temperature sensor in a non self-heated mode.

The value LoadF then can be used to compensate the LSHotV/ValvoutV ratio referred to herein as WetSup, or:

New WetSup=WetSup/Loadf or

WetSup=[LSHotV/ValvoutV]/[ValveCommand*{HSSATT-VlvoutT}]

By this calculation then, the controller 70 can accurately control mass flow, pressure and so on of the working fluid 12 through the evaporator under changing load conditions to maintain a desired state setpoint, for the working fluid in a low superheat state, higher superheat state or wetter state (quality less than 100%). The low side sensor 150 can thus be used as a quality sensor for low superheat and wetter states, and can be used as a superheat sensor for low and higher superheat states with compensation for pressure changes due to load variations.

While the control circuit 40 has been described with respect to a specific embodiment thereof, the functions of the circuit can be realized in many different embodiments. For example, typical component valves have been provided in FIG. 2, but these are merely exemplary. The graphs of the various figures also are intended to represent typical relationships that could be found in a representative system. Thus, the invention provides apparatus and methods for detecting characteristics of and controlling mass flow of a working fluid in a heat transfer system that is controlled electronically and can accurately detect such characteristics without the need for mechanical or electromechanical pressure sensors and transducers.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. Apparatus for detecting working fluid state in a heat transfer system of the type having an evaporator and an expansion valve for controlling mass flow of the working fluid to the evaporator, the apparatus comprising: a first sensor disposed in the working fluid on the outlet side of the evaporator; said first sensor producing a first signal related to the working fluid state; a second sensor disposed in the working fluid on the inlet side of the evaporator; said second sensor producing a second signal related to a pressure dependent characteristic of the working fluid; and control means for receiving said first and second signals, said control means including means for determining a ratio of said first and second signals, said control means further determining the working fluid state based on said ratio of said first and second signals.

2. The apparatus of claim 1 wherein said first sensor comprises a first thermistor, and said control means produces localized heating of the working fluid at the thermistor.

3. The apparatus of claim 2 wherein said control means provides a current through the first thermistor with the first thermistor self-heating in response to said current to cause localized heating of the working fluid.

4. The apparatus of claim 3 wherein said first thermistor detects the quality of the working fluid and detects superheat of the working fluid.

5. The apparatus of claim 4 wherein said control means applies a constant current level to the first thermistor and detects the voltage across the first thermistor in response to said constant current.

6. The apparatus of claim 1 wherein said first sensor comprises a self-heated thermistor and said second sensor comprises a second thermistor.

7. The apparatus of claim 1 wherein said first sensor detects quality and superheat of the working fluid, and said second sensor detects saturation temperature of the working fluid.

8. The apparatus of claim 7 wherein said second sensor comprises a thermistor that detects the temperature of the working fluid at an inlet to the evaporator.

9. The apparatus of claim 8 wherein said first sensor comprises a self-heated thermistor.

10. The apparatus of claim 1 wherein said ratio compensates said first signal for load variations at the evaporator.

11. The apparatus of claim 10 comprising a third sensor disposed on the high pressure side of the expansion valve and produces a third signal related to saturation pressure of the working fluid.

12. The apparatus of claim 11 wherein said control means produces a fourth signal used to control the mass flow of the working fluid through the expansion valve, said control means detecting mass flow through the expansion valve based on said second, third and fourth signals.

13. The apparatus of claim 10 wherein said control means compensates said ratio for pressure drop changes across the evaporator caused by said load variations.

14. The apparatus of claim 1 wherein said control means uses said ratio as part of a control algorithm for controlling mass flow through the evaporator to maintain a superheat setpoint condition.

15. Apparatus for mass flow control of a working fluid in a heat transfer system of the type having an evaporator and an expansion valve for controlling mass flow of the working fluid to the evaporator, the apparatus comprising: a first thermistor disposed in the working fluid on the inlet side of the evaporator; a second self-heated thermistor disposed in the working fluid on the outlet side of the evaporator; and control means for controlling mass flow of the working fluid to the evaporator to maintain a state setpoint of the working fluid at the evaporator outlet; said control means using said self-heated thermistor to produce a signal related to said working fluid state and using said first thermistor to compensate said working fluid state signal for evaporator load changes.

16. The apparatus of claim 15 comprising a third thermistor disposed in the working fluid on the high pressure side of the expansion valve, said control means compensating said detected working fluid state for pressure changes across the evaporator by using said first and third thermistors to detect mass flow through the evaporator.

17. The apparatus of claim 16 wherein said third thermistor is a self heated thermistor used to detect a minimum thermal conductance between the thermistor and the high pressure working fluid.

18. The apparatus of claim 15 wherein said state setpoint corresponds to a desired superheat condition of the working fluid at the outlet of the evaporator.

19. The apparatus of claim 15 wherein the control means uses the second thermistor to detect quality and superheat conditions of the working fluid.

20. A method for controlling mass flow of a working fluid through an expansion valve and evaporator in a heat transfer system, comprising the steps of:
   a) detecting the working fluid state on the outlet side of the evaporator;
   b) detecting a characteristic of the working fluid state on the inlet side of the evaporator related to load changes at the evaporator;
   c) compensating said detected working fluid state for said detected load changes; and
   d) adjusting mass flow of the working fluid through the evaporator to maintain a state setpoint of the working fluid.

21. The method of claim 20 comprising the step of detecting pressure changes across the evaporator caused by said load changes, and compensating said detected working fluid state therefor.

22. The method of claim 21 wherein said pressure changes caused by load changes are detected by detecting mass flow of the working fluid to the evaporator.

23. The method of claim 22 wherein the working fluid state is detected using a self-heated thermistor; saturation temperature of the working fluid on the inlet side of the evaporator is detected using a second thermistor; and saturation pressure of the working fluid on the high pressure side of the expansion valve is detected using a second self-heated thermistor.

* * * * *